United States Patent [19]

Westhoff et al.

[11] Patent Number: 4,890,863
[45] Date of Patent: Jan. 2, 1990

[54] METALLIC ADJUSTABLE CLAMPING BAND FOR GASKETS

[75] Inventors: James Westhoff, Langhorne; James A. Kelly, Warrington, both of Pa.

[73] Assignee: A-Lok Products, Inc., Tullytown, Pa.

[21] Appl. No.: 174,076

[22] Filed: Mar. 28, 1988

[51] Int. Cl.⁴ .......................... F16L 5/02; F16L 41/08
[52] U.S. Cl. ..................................... 285/39; 285/192; 285/196; 285/420
[58] Field of Search ............... 285/162, 192, 196, 214, 285/222, 230, 236, 370, 371, 397, 398, 420; 403/344; 404/26; 24/270, 271, 280, 281

[56] References Cited

U.S. PATENT DOCUMENTS

| | | | |
|---|---|---|---|
| 2,660,271 | 11/1953 | Hupp | 403/393 X |
| 3,101,743 | 8/1963 | Hoke | 285/370 X |
| 3,614,139 | 10/1971 | Harrison | 403/344 |
| 3,958,313 | 5/1976 | Rossborough | 29/157 R |
| 4,215,868 | 8/1980 | Skinner et al. | 277/1 |
| 4,288,892 | 9/1981 | Mardirossian | 24/573 X |
| 4,387,900 | 6/1983 | Ditcher et al. | 277/101 |
| 4,478,437 | 10/1984 | Skinner | 285/189 |
| 4,582,450 | 4/1986 | Neil | 404/26 |
| 4,585,091 | 4/1986 | Budd | 403/344 |
| 4,711,455 | 12/1987 | Ditcher et al. | 277/9.5 |

*Primary Examiner*—Dennis L. Taylor
*Assistant Examiner*—Arlen L. Olsen
*Attorney, Agent, or Firm*—Louis Weinstein

[57] ABSTRACT

A metallic clamping band of channel-shaped cross-section is arranged in a ring-shaped manner and has a discontinuity so as to define two adjacent free ends thereof. A curved channel-shaped insert has one of its ends welded to one end of said clamping band while the other of its ends is free to slidably engage the remaining end of the clamping band. The remaining end of the clamping band is provided with a plurality of openings arranged at spaced intervals along each of the sidewalls of the channel shaped member to define a plurality of pairs of openings. A locking pin is insertable into one of said pairs of openings to engage the free end of the insert portion and thereby maintain the clamping band in the expanded and locked position. The free end of the insert preferably has an extending tongue adapted to be positioned between the locking pin and the base of the clamping band when in the locked position. A pair of solid members are welded respectively to the insert and the clamping band to receive an expander for expanding the clamping band to the desired diameter. The holes may be replaced by slots having offset portions for receiving and seating the locking pin. The locking openings in the sidewalls may be replaced by a set screw which lockingly engages the insert to hold the clamping band in the locked position.

13 Claims, 8 Drawing Sheets

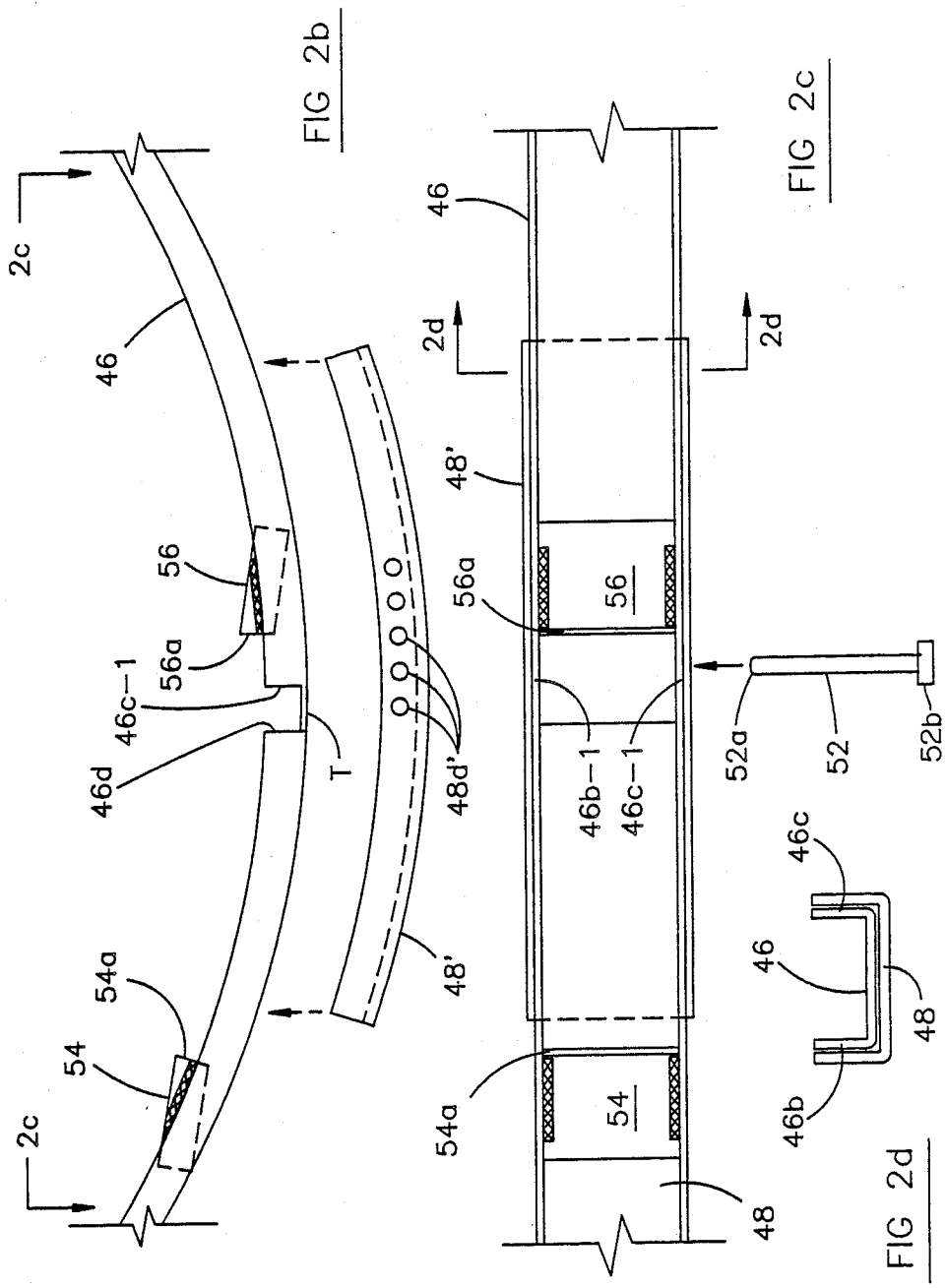

METALLIC ADJUSTABLE CLAMPING BAND FOR GASKETS

FIELD OF THE INVENTION

The present invention relates to clamping bands for clamping one end of a resilient gasket into an opening and more particularly to a mechanical clamping band of novel design which permits the mass production of clamping bands without great concern for precise sizing.

BACKGROUND OF THE INVENTION

Clamping bands are typically utilized for clamping one end of a resilient gasket into an opening. For example, U.S. Pat. No. 4,387,900 assigned to the assignee of the present invention discloses a gasket intended for use in an opening in manhole bases and which is intended for in situ installation within the openings of manhole bases which have either been precast at the factory or cored either at the factory or at a job site. A clamping band is urged against the gasket, placing the gasket under compression to effect a fluid-tight seal between the gasket and the opening in the manhole base. The opposite end of the gasket forms a watertight seal with a pipe extending through the gasket. The clamping band described in U.S. Pat. No. 4,387,900 is a plastic band which is substantially precisely pre-sized preparatory to delivery at the job site and is provided with a small insert portion hingedly connected to one of the free ends of the clamping band. The clamping band is expanded by suitable expansion apparatus and the pivotal wedge is swingably moved into the gap between the two free ends of the clamping band. The expansion force is released whereby the clamping band and cooperating insert maintain the clamping band in the locked position.

One of the problems with clamping bands of the above design is that there is a difficulty in insertion of the insert member and further that the clamping bands are not capable of compensating for large differences in opening diameter due to loose manufacturing tolerances when forming manhole base openings either in the factory or in the field.

An improved clamping band described in pending application Ser. No. 778,690, filed Sept. 23, 1985 and assigned to the assignee of the present invention eliminates the hingedly mounted insert, enabling the free ends of the clamping band to be moved into engagement and butt together. Nevertheless, this improvement suffers from the same disadvantages recited hereinabove with regard to the clamping band described in U.S. Pat. No. 4,387,900. In addition, the improved clamping band necessitates expansion of the clamping band to a degree sufficient to move the free ends apart by an amount sufficient to enable the overlapping end to snap outwardly into the locked position.

BRIEF DESCRIPTION OF THE INVENTION

The present invention is characterized by being comprised of a design which provides excellent clamping and compressive forces when properly mounted and is nevertheless easily removable and reusable.

The clamping band of the present invention overcomes all of the disadvantages of the prior art and is characterized by comprising a channel-shaped metallic clamping band which is bent into a generally ring shaped structure. The clamping band is formed of a stainless steel capable of withstanding the corrosive influences typically encountered in sewage systems without experiencing any significant deterioration.

One end of the clamping band is provided, in one preferred embodiment, with an extension of similar cross-section and slightly reduced in width and height so as to be able to freely slide into the opposite free end of the channel-shaped clamping band. The aforesaid opposite free end of the clamping band is provided with a plurality of pairs of openings (or slots), one opening in each pair of openings being arranged in an associated one of the upright sides defining the channel, the openings of each of said pairs of openings being in axial alignment.

The aforementioned extension member is freely slidable within the adjacent end of the clamping band and is provided with an extending tongue adapted for positioning beneath a pin inserted into one of the pairs of openings to maintain the clamping band in the clamped position, the pair of openings chosen for receipt of the pin being a function of the desired outer diameter of the expanded clamping band which is necessary to maintain the gasket under proper compression.

The band is provided with a pair of solid members which are preferably welded into the interior surface of the clamping band and at spaced intervals relative to one another in order to provide driving surfaces for engagement with an expansion assembly to enable expansion of the clamping band to the proper size.

The expansion assembly is preferably a hydraulic expander having a first stationary projection and a second swingable projection which is moved outwardly as the hydraulic expander is driven by hydraulic pressure causing the expander piston rod to swing the swingable projection outwardly.

The fixed and swingable projections of the expander respectively engage shoulders of the clamping band solid members to expand the clamping band. The expansion assembly is provided with a gauge to facilitate the expansion and clamping operation. When the gauge reaches the correct PSI reading, the locking pin is inserted into the appropriate pair of openings such that the tongue slides beneath the locking pin and so that the adjacent free edges of the upright sides of the channel abut the locking pin. In the event that the free edges of the channel upright sides partially block the desired pair of openings at the desired PSI, the hydraulic pressure may be increased just enough to clear the aforesaid free edges of the upright sides in order to facilitate insertion of the locking pin.

In another preferred embodiment, a channel-shaped saddle of slightly larger width is welded to one end of the clamping band and slidably receives the opposite end of the clamping band. The saddle sidewalls are provided with openings for receiving a locking pin. The free end of the clamping band slidable in said saddle is provided with a tongue which moves beneath the pin when the clamping band is in the desired expanded position.

The clamping band has excellent structural strength and most importantly, need not be critically sized and will, in fact, readily and easily provide an excellent fluid-tight seal between gasket and manhole opening even in situations where the diameter of the opening differs significantly from the nominal diameter. In addition, the clamping band is easily removed (without destruction) by removing the drive pin and is thus not only readily removable but reusable.

In still another preferred embodiment, an insert of reduced width is placed into and welded to one end of the clamping band. The opposite free end of the insert slides into an opening defined by the opposite free end of the clamping band and a thick metallic segment bridging the sidewalls of the clamping band and welded thereto. A set screw threadedly engages a tapped opening in said thick segment, a tapered tip extends toward the insert and the set screw is rotated to intimately engage the insert when the clamping band is expanded to the desired diameter. The insert may be provided with a plurality of spaced openings or bores to facilitate receipt and firm locking between the set screw and the insert.

In another embodiment the pairs of holes may be replaced by slots with offset portions for receiving and locking the locking pin into position.

OBJECTS OF THE INVENTION

It is therefore one object of the present invention to provide an novel clamping band having a design which permits the clamping band to accomodate the fluid-tight mounting of gaskets in openings which may differ significantly from a nominal or expected diameter.

Still another object of the present invention is to provide a novel all-metallic clamping band for use with gasket assemblies and the like wherein the clamping band is provided with a channel-shaped cross section having openings in the channel uprights sides for cooperation with a locking pin insertable into a cooperating pair of said openings for locking said clamping band by engagement with the opposite free end thereof.

Still another object of the present invention is to provide a novel metallic clamping band having a design which is capable of being easily and readily expanded through the use of a novel expansion assembly.

Still another object of the present invention is to provide a metallic corrosion resistant clamping band with an insert extending from one end of the band and slidable into an opening in the opposite end of the band and being locked in place by means of a set screw.

BRIEF DESCRIPTION OF THE FIGURES

The above as well as other objects of the present invention will become apparent when reading the accompanying description and drawing in which:

FIG. 2b shows an exploded side view of another embodiment of the clamping band.

FIG. 2c is a top plan view of the embodiment shown in FIG. 2b.

FIG. 2d is a sectional view looking in the direction of the arrows 2d—2d in FIG. 2c.

FIG. 2e is a perspective detailed view of a portion of the embodiment of FIG. 2a.

DETAILED DESCRIPTION OF THE INVENTION AND THE PREFERRED EMBODIMENTS THEREOF

Figure 1:
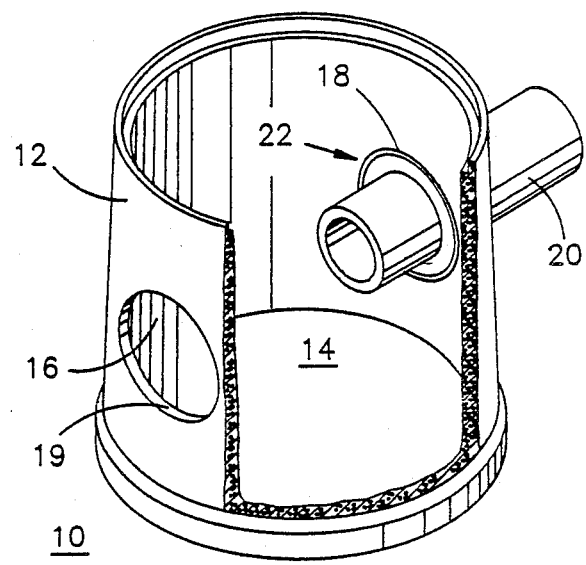
FIG. 1 shows a perspective view of the gasket assembly arranged within a manhole base, the gasket assembly being of the type capable of employing the clamping band of the present invention to great advantage.

FIG. 1 shows a manhole base 10 having a cylindrical shaped side wall 12 integral with and extending upwardly from floor 14. A pair of openings 16, 18 are formed in the sidewall 12 of manhole base 10 either by a casting or a coring operation and each opening is adapted to receive a pipe section such as shown at 20. The manhole base forms part of a manhole assembly which provides relatively easy access to the sewer system, as is conventional. A gasket assembly 22 provides a fluid-tight seal between the manhole base and pipe 20 and is sufficiently flexible to compensate for deviations in concentricity of pipe 20 relative to opening 18 due to vibration, settling, eccentricity in both the openings 18 and pipe 20 and so forth. Gasket assembly 22 comprises the gasket 32 and a clamping band 46 mounted within manhole opening 18 as will be described in detail hereinbelow.

Figure 1A:
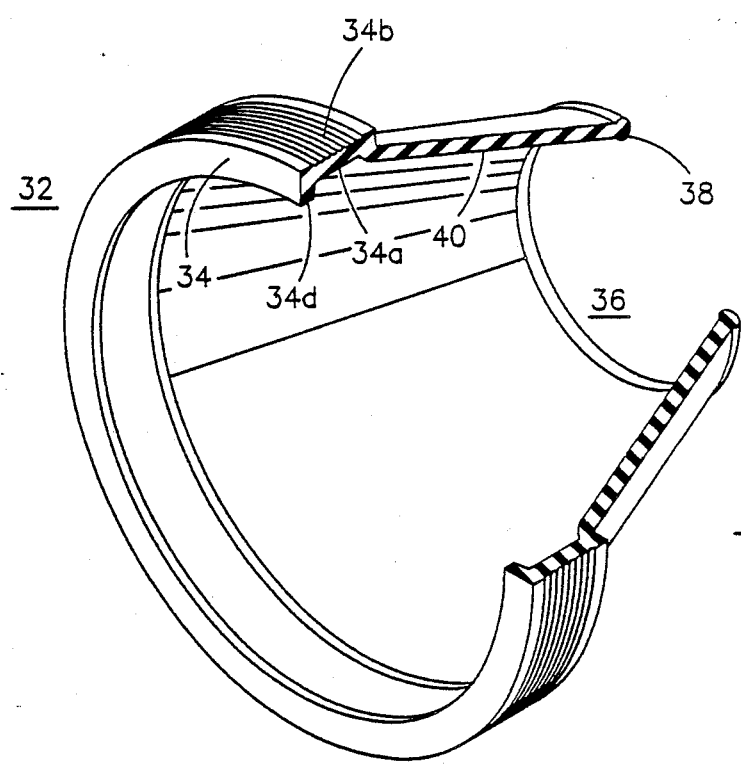
FIG. 1a shows a perspective view, partially sectionalized, of the gasket employed in the assembly of FIG. 1.

FIG. 1a shows a partially sectionalized perspective view of gasket 32 which is comprised of annular flange 34 defining an opening of larger diameter being integrally joined to a conical-shaped portion 40 which terminates in an enlarged beaded periphery 38, generally shaped like an O-ring which defines an opening 36 of smaller diameter than the opening defined by flange 34.

Figure 1B:
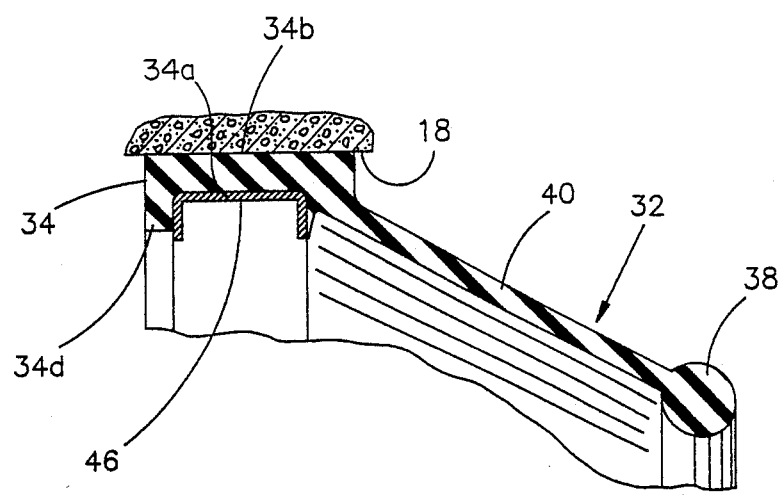
FIG. 1b shows the gasket of FIG. 1A with the clamping band and the manhole opening of FIG. 1 in the operative position.

Flange 34 preferably has a band supporting surface or recess 34a as shown for example, in FIG. 1b, and an outer periphery comprised of a plurality of V-shaped projections 34b cooperatively defining recesses 34c which enable the projections 34b to be pressed laterally and downwardly against the main body of flange 34 when the gasket is compressed between a clamping band and a manhole base opening, as will be more fully described.

Figure 2:
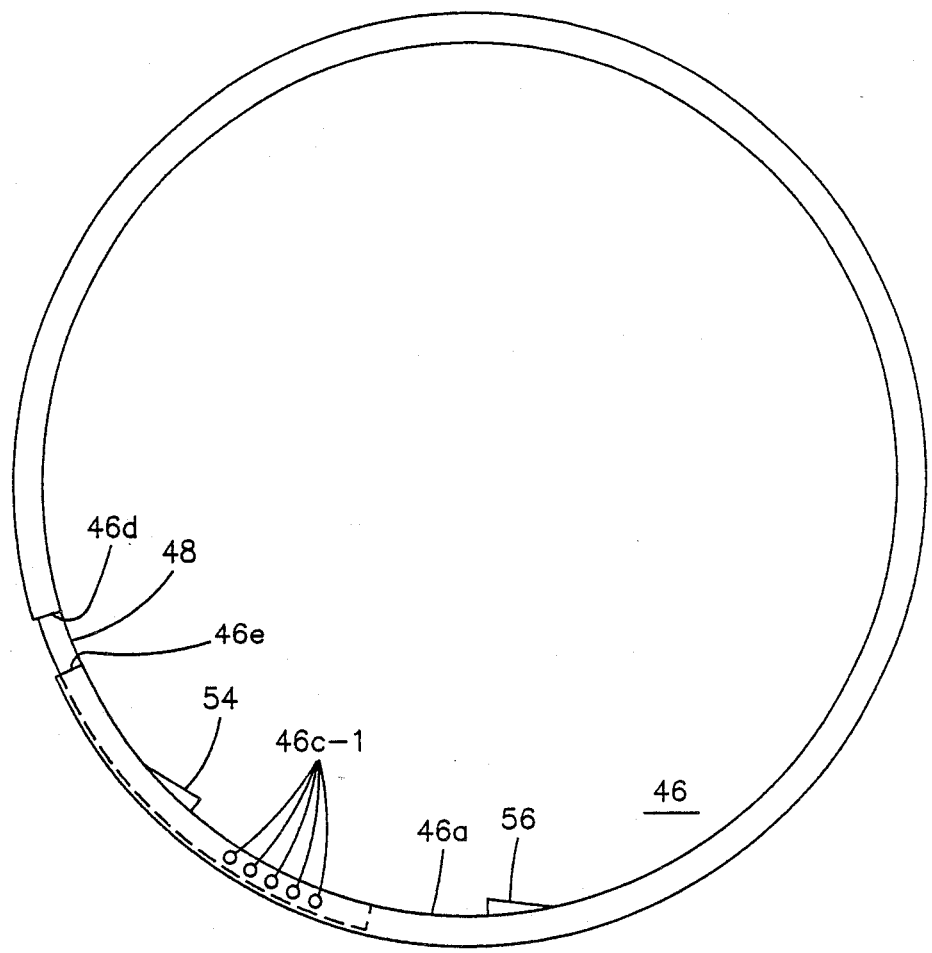
FIG. 2 shows a side view of clamping band designed in accordance with the principles of the present invention.

Compression or clamping band 46 (see FIGS. 2 and 2a) is a substantially circular-shaped band formed of a suitable anti-corrosive metallic material such a stainless steel. FIG. 1b shows a simplified cross-section of clamping band 46 which is shown in greater detail in FIGS. 2–2e and is a substantially ring-shaped member having a substantially uniform channel-shaped cross-section over substantially the major portion of its circumference. Clamping band 46 has a channel-shaped or C-shaped configuration defined by a base portion 46a and two upright sidewalls 46b, 46c integral with base 46a as shown best in FIG. 2d.

The clamping band 46 has a substantially uniform cross-sectional configuration forming slightly less than a fully or complete circle and thereby terminating at ends 46d and 46e. A curved insert segment 48 has a channel-shaped cross-section which is substantially similar to the channel-shaped cross-section of member 46 but which is of a slightly reduced width and slightly reduced height so that the segment is capable of being inserted within and embraced by the adjacent channel-shaped end portions of band 46. The left-hand end of insert 48 is arranged so that a portion 48a extends into the adjacent end of clamping band 46 and is preferably secured thereto by a welding operation. The insert 48 extends to the right of the free end 46d of clamping band 46 and slidably extends into the interior of the opposite end 46e of the clamping band.

Figure 2A:
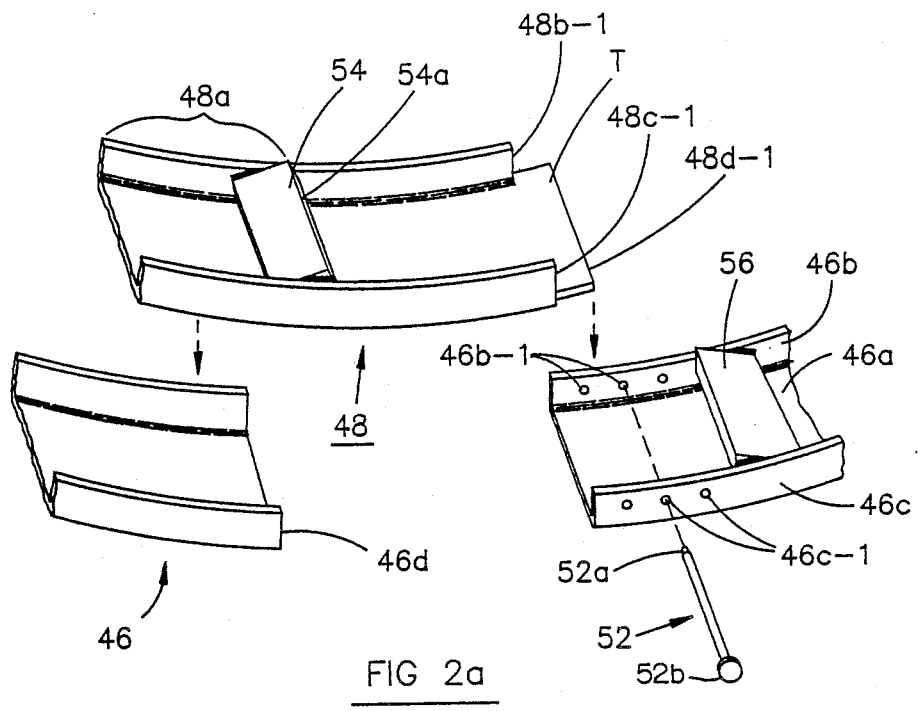
FIG. 2a shows an enlarged exploded view of a portion of the clamping band of FIG. 2.
Figure 2E:
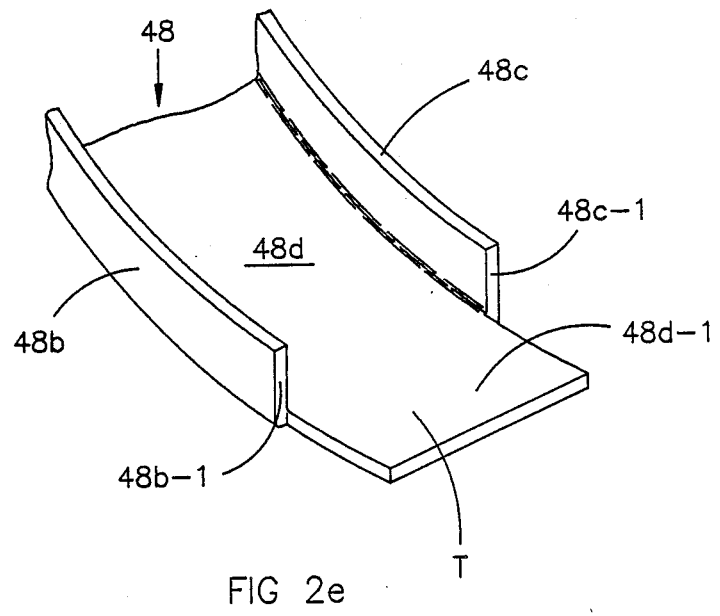

The right-hand end of insert 48 is cut or formed in such a manner as to position the free edges 48b-1, 48c-1 of the insert channel-shaped sides 48b, 48c a spaced distance inwardly from the free edge 48d-1 of the channel-shaped base portion 48d so as to define a tongue T at one end of the insert portion (see FIGS. 2a and 2e).

The portion of clamping band 46 into which the free right-hand end of insert 48 is slidably inserted, is (in one preferred embodiment) provided with a plurality of pairs of openings, each opening of a pair of openings being provided in one of the side walls of the channel shaped insert 46. For example, FIG. 2a shows a portion of the clamping band 46 in which the sidewalls 46b and 46c are provided with openings 46b-1 and 46c-1 respectively, the openings in the side wall being aligned so as to form cooperating pairs thereof.

A tapered locking pin 52 having a substantially cylindrical-shaped body, a tapered tip 52a and an enlarged head 52b is insertable into an associated pair of said openings in the clamping band sidewalls in such a manner as to be engaged by the edges 48b-1, 48c-1 of insert side walls 48b and 48c and further so that the tongue T at the free end of insert 48 slides beneath pin 52 and into the region between pin 52 and the base 46a of channel 46.

The clamping band 46 is further provided with a pair of thick solid blocks 54 and 56 which are respectively secured in place respectively at predetermined locations within the insert 48 and the clamping band 46. Members 54 and 56 are secured in place, preferably by welding, in such a manner as to be oriented at an angle relative to the clamping band as shown best in FIG. 2a so as to define a pair of shoulders 54a, 56a which cooperate with the expander assembly shown in FIG. 3 in a manner to be more fully described in order to facilitate expansion of the clamping band.

Figure 3:
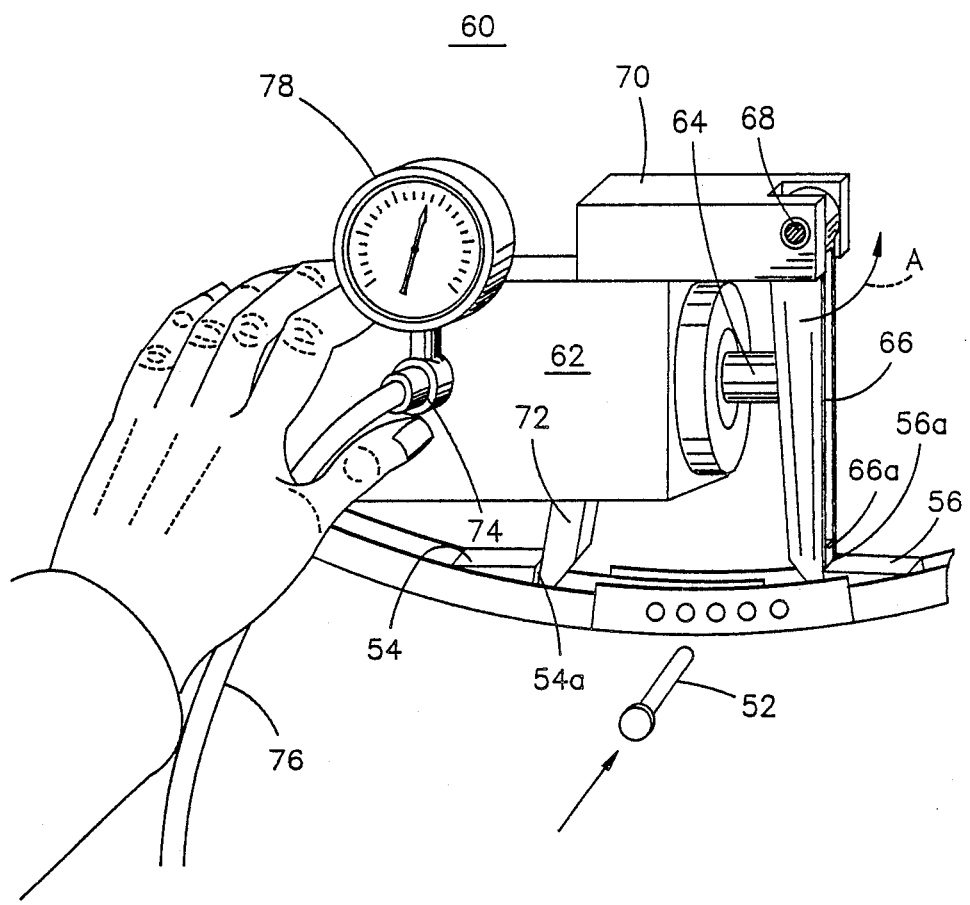
FIG. 3 shows a perspective view of an expander assembly and further showing a portion of the clamping band assembly and the manner in which the expander assembly cooperates with the clamping band for expanding and locking the clamping band in the desired position.

The expander assembly 60, shown in FIG. 3 is comprised of a housing 62 having a hydraulic cylinder provided with a piston (not shown). The piston is provided with a piston rod 64 which extends outwardly through the right-hand end of housing 62 and abuts against a swingable member 66 pivotally mounted by pivot pin 68 to a supporting bracket 70 whose left-hand end is rigidly secured to the top of housing 62. Swingable member 66 is provided with a tapered free end 66a adapted to rest against the shoulder 56a of member 56. A stationary projection 72 extends downwardly from the underside of housing 62 and is adapted to engage the shoulder 54a of member 54.

A coupling 74 couples hydraulic pressure from conduit 76 to the cylinder provided within housing 62. A gauge 78 is provided to measure the hydraulic pressure. The hydraulic pressure delivered to expander 60 may be introduced by means of a conventional manually operable mechanical pump or a motor-operated hydraulic pump source, not shown for purposes of simplicity.

Expansion of the clamping band is accomplished in the following manner:

The gasket 32 is arranged within the opening 18 of manhole base 10. The clamping band is arranged within the recess 34a provided in the gasket. The expander assembly is positioned within the clamping band in the manner shown in FIG. 3 so that stationary projection 72 rests against shoulder 54a and so that the free end 66a of swingable projection 66 rests against shoulder 56a. Expander assembly 60 is expanded by introduction of hydraulic pressure causing swingable arm 66 to swing outwardly under control of the piston rod in the direction shown by arrow A thus moving shoulders 54a and 56a apart thereby expanding the clamping band 46. When the desired PSI reading is obtained on gauge 78, the hydraulic pressure is maintained and the tapered locking pin 52 is inserted into the appropriate pair of openings which lie immediately adjacent to the edges 48b-1 and 48c-1 of the clamping band insert 48. In the event that these edges slightly overlie the desired openings, the pressure may be increased just slightly and yet sufficiently to clear the edges 48b-1, 48c-1 from the desired openings, thereby enabling the locking pin to be inserted. Once the locking pin is inserted, the hydraulic pressure delivered to the expander 60 is gradually released, allowing the swingable arm 66 to rotate in the direction opposition that shown by arrow A in order to be removed from the clamping band. Locking pin 52 maintains the clamping band in the desired expanded and locked position which position causes the clamping band to exert the desired pressure i.e. locking force, against portion 34 of the gasket 32, maintaining the gasket under compression and thereby providing a good water-tight seal between the manhole opening 18 and gasket 32. The gasket is then folded in by moving the beaded end 38 of the gasket in the direction of arrow B as shown in FIG. 1b.

In one practical example, for the fluid-tight coupling of a connector gasket positioned within a 12" diameter opening in a manhole base, the desired expansion is obtained in a range from 2500 to 3500 psi pressure applied to the expander.

Pipe 20 is then inserted into opening 36 in gasket 32 which arrangement is conventional and thus will not be described in detail herein. A stainless steel strap may be tightened about gasket 32, if desired.

The use of the insert provides a resulting clamping band having a substantially uniform shape over substantially its entire annular extent except for the slight portion of the clamping band in which the ends 48d, 48e are displaced from one another exposing a portion of the insert 48.

The expansion and locking operation is quite simplified and the design of the clamping band greatly facilitates removal of the clamping band which is simply done by reinserting the expander 60, expanding the clamping band by introduction of the desired level of hydraulic pressure, as measured by gauge 78 and thereafter removal of the locking pin. The hydraulic pressure is preferably released in a gradual manner to enable the clamping band diameter to be reduced in a safe manner. The clamping band may then be removed from the gasket and replaced whenever desired.

Figure 4:
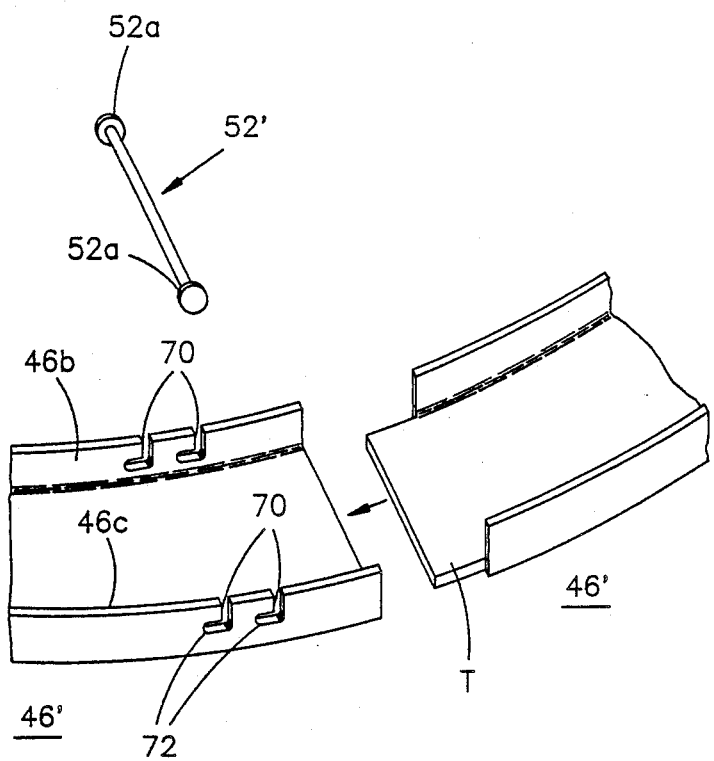
FIG. 4 is a perspective view of another alternative embodiment for the clamping band of the present invention.

FIG. 4 shows another preferred embodiment of the present invention in which the clamping band 46' is modified by providing a plurality of slots in each of the sidewalls 46b, 46c of channel 46' in which the lower end of each slot 70 is provided with n offset portion 72. Each slot 70 in channel side 46b, as well as its offset portion 72, is aligned with an associated slot and offset portion provided in channel side 46c. In place of the locking pin 52 provided in the embodiment shown in FIG. 2, there is provided a pin 52' with an enlarged head 52a, 52a at each opposite end. Instead of inserting the locking pin into the openings, the manner of operation of the embodiments shown in FIG. 4 is substantially similar to that shown in the embodiment of FIG. 2 in that the clamping band is enlarged by use of the expander shown in FIG. 3 and, when the appropriate hydraulic pressure is achieved, which condition is indicated by observation of the gauge 76, the locking pin 52' is dropped into or inserted into an associated pair of slots 70 provided in channel sidewalls 46b, 46c. Locking pin 52' is urged toward the bottom end of the pair of slots 70 and preferably maintained in this position at least momentarily while the hydraulic pressure is released. The hydraulic pressure is released preferably in a very gradual manner in which case the clamping band slightly reduces its diameter, moving the tongue T beneath locking pin 52' and moving the insert edges 48b-1, 48c-1 against associated portions of the locking pin 52' positioned just inwardly of the enlarged ends 52a, 52a, thus urging and maintaining the locking pin 52' in the offset portions 72 of the cooperating slots. The locking pin is maintained in this position thereby maintaining the clamping band in the clamped position whereby the portion of the gasket positioned between the clamping band 46' and the surface of the manhole opening 18 is compressed between the surfaces thereby providing an excellent water-tight seal. In order to facilitate the locking pin 52' being maintained in the offset portions of 72 of slots 70, the edges 48b, 48c of insert 48 may be tilted as shown at 48e or alternatively may be slightly curved to urge the locking pin 52' downwardly and into the offset portion 72.

The significant advantages of the clamping band as described herein reside in its ease of installation and further in that the clamping band need not be accurately and precisely sized prior to its insertion and movement to the clamp into locked position.

In addition to the above, the clamping band of the present invention is readily removable and is reusable.

The expander simplifies the clamping band expansion and locking operation and is provided with a design which provides adequate opening leverage to greatly simplify the expanding operation, whether it be for insertion or removal of a clamping band.

The embodiment of FIGS. 2b through 2d differs from that shown in FIG. 2a in that the insert 48' comprises a channel-shaped saddle portion which is slightly wider than the clamping band 46 so as to receive the free ends of the clamping band 46 within saddle 48'.

The left-hand end of saddle 48' is welded to end 46d of the clamping band while the opposite end of the clamping band is freely slidable within saddle 48'. The segments 54 and 56 are welded in place at spaced circumferential distances inwardly from the ends of clamping band 46. Saddle 48' is provided with openings 48d for receiving the tapered locking pin 52 shown in FIG. 2c.

The insertion and expansion of the embodiment of FIGS. 2b through 2d is substantially identical to the technique employed for the embodiment of FIG. 2b wherein the expander of FIG. 3 has its projection 72 and 66 engaging members 54 and 56 to expand the clamping band. When the appropriate pressure reading is observed upon gauge 78, expansion is halted and the locking pin is inserted through selected ones of the openings 48d in saddle 48'. Thereafter, the hydraulic pressure is gradually released with tongue T arranged beneath the locking pin and with the edges 46b-1 and 46c-1 engaging locking pin 52 to retain the clamping band assembly in the locked position.

Figure 5A:
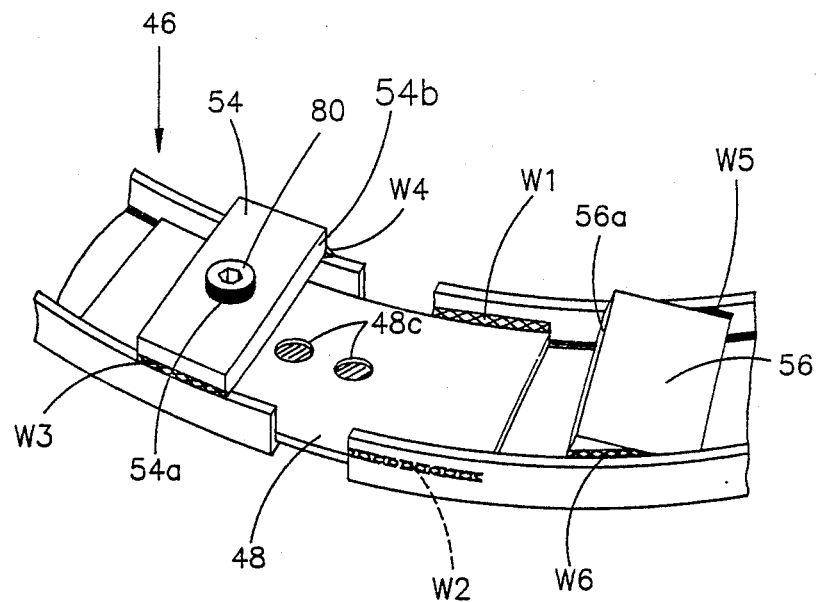
FIG. 5a shows a perspective view, partially sectionalized, of still another embodiment of the present invention.
Figure 5B:
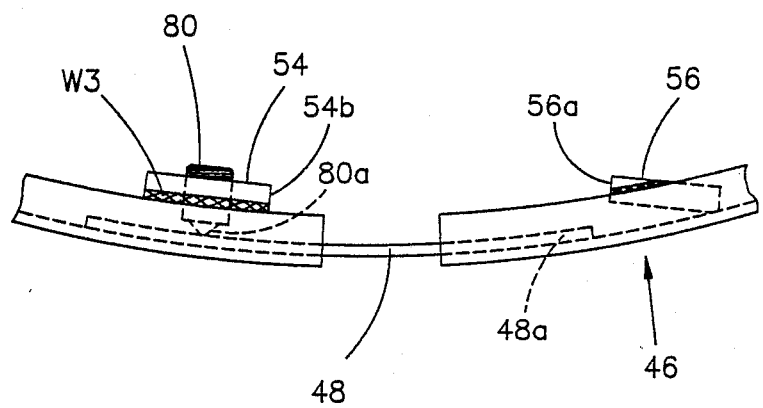
FIG. 5b shows a side view of the embodiment of FIG. 5.

FIGS. 5a and 5b show still another preferred embodiment of the present invention in which insert 48 is comprised of a relatively thick curved plate having a width slightly less than the width of the clamping band 46 so as to be slidably received within the channel-shaped end portions. The right-hand end 48a of insert 48 is secured to an associated portion of the clamping band by welding, as shown by weldments $W_1$ and $W_2$. The left-hand end 48b of insert 48 is slidable along the associated portion of clamping band 46 and slides beneath segment 54 which is secured to the clamping band by weldments $W_3$ and $W_4$. Segment 54 is provided with a tapped opening 54a for receiving set screw 80 having a tapered lower end 80a which engages insert 48. Segment 56 is welded to clamping band 46 in the position shown as represented by weldments $W_5$ and $W_6$.

The manner in which the clamping band embodiment of FIGS. 5a and 5b functions is substantially similar to the prior embodiments in that the expander assembly of FIG. 3 engages surfaces 54b and 56a of segments 54 and 56. Hydraulic pressure is applied causing the expander assembly to expand the clamping band to increase its circumference. When the appropriate pressure reading is observed upon gauge 78, set screw 80 is tightened causing the tapered end 80a to "bite" into the insert thereby retaining the clamping band assembly in the locked position.

As an alternative arrangement, insert 48 may be provided with a plurality of closely spaced openings 48c. The openings shown are substantially oval-shaped. However, the openings may be circular, if desired. As another alternative, the openings may be tapered bores which need not necessarily extend through insert 48 and which preferably have a shape substantially conforming to the tapered end 80a of the set screw 80.

In the event that it is desired to remove the clamping band, the expander is mounted in place, the hydraulic pressure of the appropriate level is applied and set screw 80 is loosened whereupon the hydraulic pressure is then gradually released.

A latitude of modification, change and substitution is intended in the forgoing disclosure, and in some instances, some features of the invention will be employed without a corresponding use of other features. Accordingly, it is appropriate that the appended claims be construed broadly and in a manner consistent with the spirit and scope of the invention herein described.

The embodiments of the invention in which an exclusive property or privilege is claimed are defined as follows:

1. An internal clamping apparatus including a clamping band inserted within the interior of a hollow, resilient, annular gasket for clamping said resilient gasket against an opening in a sidewall to form a fluid-tight seal between said gasket and said opening in said sidewall, said clamping band comprising;

a substantially annular-shaped metallic member having a discontinuity so as to define first and second ends thereof;

said metallic member having a substantially channel-shaped cross section defined by a base portion and integral upright sides;

an extension having a curved configuration and a cross-section generally conforming to the channel-shaped cross-section of said clamping band;

one of the ends of said extension engaging one end of said clamping band and being secured thereto;

the opposite end of said extension slidably engaging the remaining end of said clamping band; and locking means for locking said clamping band to said extension to maintain the clamping band in a desired expanded position to urge said gasket radially outwardly and against said opening.

2. The clamping apparatus of claim 1 wherein the opposite end of said clamping band has a plurality of locking means arranged at spaced intervals in the sidewalls defining said channel-shaped cross-sectional configuration so that each locking means in one of said sidewalls is aligned with an associated locking means in the other of said channel sidewalls to define a plurality of pairs of cooperating locking means; and pin means insertable into one of said pairs of locking means and engaging the free end of said extension.

3. The clamping apparatus of claim 2 further comprising a pair of solid members one of which is secured to the interior of said clamping band adjacent said locking means and the other of which is secured to said extension a spaced distance inwardly from the free end thereof;

said solid members each having an abutting shoulder;

an expander having a pair of projections respectively adapted to engage an associated one of said shoulders;

said expander being capable of being adapted to move said projections apart in order to impart a separating force to said shoulders thereby expanding said clamping band.

4. The clamping apparatus of claim 3 wherein the edges of said channel-shaped side walls of said insert engage said pin means when said tongue is in the locked position between said locking pin and the interior surface of said clamping band base portion.

5. The apparatus of claim 2 wherein said locking means comprises a plurality of slots provided in each of the channel sides, the bottom end of each of said slots being provided with an offset portion for receiving and maintaining the pin means in the locked position.

6. The apparatus of claim 5 wherein said locking pin is comprised of an elongated pin having integral enlarged heads at each end thereof.

7. The clamping apparatus of claim 2 wherein the free end of said extension is provided with an extending tongue adapted to be positioned between said pin means and the base portion of said clamping band.

8. The clamping apparatus of claim 1 wherein said clamping band is formed of stainless steel.

9. The apparatus of claim 1 wherein said locking means comprises a series of holes provided in each of the channel sides.

10. The clamping apparatus of claim 1 wherein said extension comprises a member of slightly smaller width than said channel and being inserted into and welded to one end of said channel and being slidable within the opposite end of said channel.

11. The clamping apparatus of claim 1, wherein said extension is a curved member having a channel-shaped cross-section;

said extension being arranged to embrace the ends of said clamping band.

12. The claim apparatus of claim 11 wherein said extension is slightly wider than the width of said clamping band.

13. The claim apparatus of claim 11 wherein said extension is slightly narrower than the width of said clamping band.

* * * * *

UNITED STATES PATENT AND TRADEMARK OFFICE
CERTIFICATE OF CORRECTION

PATENT NO. : 4,890,863
DATED : January 2, 1990
INVENTOR(S) : Westhoff et al.

It is certified that error appears in the above-identified patent and that said Letters Patent is hereby corrected as shown below:

Column 3, line 23, "an" should be --a--

Column 3, line 24, "accomodate" should be --accommodate--

Column 6, line 29, "opposition" should be --opposite--

Column 7, line 2, "n" should be --an--

Column 8, line 30, "Hydrualic" should be --Hydraulic--

Signed and Sealed this

Tenth Day of September, 1991

Attest:

HARRY F. MANBECK, JR.

*Attesting Officer*      *Commissioner of Patents and Trademarks*